(12) United States Patent
Thomas et al.

(10) Patent No.: US 9,259,011 B2
(45) Date of Patent: Feb. 16, 2016

(54) METHOD AND APPARATUS FOR SHREDDING MEAT

(71) Applicant: Tyson Foods, Inc., Springdale, AR (US)

(72) Inventors: Russell Thomas, Fayetteville, AR (US); James Walthers, Farmington, AR (US)

(73) Assignee: Tyson Foods, Inc., Springdale, AR (US)

( * ) Notice: Subject to any disclaimer, the term of this patent is extended or adjusted under 35 U.S.C. 154(b) by 237 days.

(21) Appl. No.: 14/063,827

(22) Filed: Oct. 25, 2013

(65) Prior Publication Data

US 2014/0048633 A1 Feb. 20, 2014

Related U.S. Application Data

(63) Continuation-in-part of application No. 13/294,461, filed on Nov. 11, 2011, now Pat. No. 8,967,505.

(51) Int. Cl.
| | |
|---|---|
| *B02C 18/18* | (2006.01) |
| *A22C 17/00* | (2006.01) |
| *B02C 18/22* | (2006.01) |
| *B26D 3/22* | (2006.01) |

(52) U.S. Cl.
CPC .......... *A22C 17/0026* (2013.01); *B02C 18/225* (2013.01); *B26D 3/22* (2013.01); *B02C 18/18* (2013.01); *B02C 18/2225* (2013.01); *B02C 2018/188* (2013.01)

(58) Field of Classification Search
CPC .............. B02C 2018/188; B02C 18/00; B02C 18/1822; B02C 18/2225; B02C 18/225; B02C 18/2241

USPC .................. 241/243, 242, 222, 223
See application file for complete search history.

(56) References Cited

U.S. PATENT DOCUMENTS

| | | | | |
|---|---|---|---|---|
| 3,915,392 | A | * | 10/1975 | Kugler ............................ 241/74 |
| 4,015,782 | A | * | 4/1977 | Granite .......................... 241/62 |
| 4,417,697 | A | * | 11/1983 | Saiki et al. ...................... 241/65 |
| 4,524,916 | A | * | 6/1985 | Keyes et al. ............. 241/101.76 |
| 4,720,050 | A | * | 1/1988 | Eberhardt .................. 241/46.06 |
| 5,368,238 | A | * | 11/1994 | Bergkamp et al. .............. 241/30 |
| 5,722,143 | A | | 3/1998 | Bucks et al. |
| 6,314,849 | B1 | | 11/2001 | Arrasmith |
| 6,378,795 | B1 | * | 4/2002 | Kelly et al. ................... 241/223 |
| 6,561,067 | B2 | | 5/2003 | Arrasmith |
| 6,931,975 | B2 | | 8/2005 | Haughton et al. |
| 7,048,218 | B2 | | 5/2006 | Hunag |

* cited by examiner

*Primary Examiner* — Faye Francis
(74) *Attorney, Agent, or Firm* — Mark E. Stallion, Esq.; Husch Blackwell LLP

(57) ABSTRACT

A shredding assembly includes a shredder having a plurality of interspersed, rotational, shredding blades. A shredder block supports the shredder and shredding blades, and further includes a first set of a plurality of vertical counter plates which are intercalated between the blades. Each counter plate has a top surface, and the top surfaces of the counter plates forms a platform. The platform serves to support pieces of a food product during shredding, and helps in the shredding process by providing a pinching action to the pieces of the product when the blades engage the pieces of the product on the platform.

21 Claims, 6 Drawing Sheets

METHOD AND APPARATUS FOR SHREDDING MEAT

CROSS-REFERENCE TO RELATED APPLICATIONS

This disclosure is a Continuation-In-Part application entitled Method and Apparatus for Shredding Meat. It claims priority or benefit in part from U.S. application Ser. No. 13/294,461 filed on Nov. 11, 2011 and now issued as U.S. Pat. No. 8,967,505 on Mar. 3, 2015.

BACKGROUND OF THE DISCLOSURE

1. Field of Disclosure

This invention relates generally to dicing or shredding food products and, more particularly, to blades for dicing or shredding meat products.

2. Background

Shortcomings in various existing equipment utilized for shredding food products, particularly meat products have been found and there are no commercially available equipment designs available for resolving the problems. When reviewing of the mechanical action of the machine, particularly the engagement of the cutting or shredding blades or knives with the meat product, the shortcomings are revealed. The engagement or cutting action of the commercially available tooling for the machine does not result in a product that appears to have been made by hand. It is desired in the industry for pizza toppings, pulled whole muscle meat products and other meat products. There doesn't appear to be an alternative tooling available in commerce that could be used to produce an item that met the customer design criteria, provide the desired pulling action and consistently produce product.

For some shredding system configurations, one shortcoming is the lack of an adequate block surrounding the shredding blades which sufficiently supports the pieces of food product approaching the shredding apparatus, so as to allow for the efficient engagement of the blades with the pieces of the product. The pieces of the product, for example, may be merely pulled around by the shredding blades rather than shredded, due to a lack of resistance therefrom. Accordingly, there needs to be an advancement to provide an efficient way for the blade to engage the pieces of the product.

BRIEF SUMMARY OF DISCLOSURE

One embodiment of the invention is an apparatus comprising a circular blade shredding device to produce a consistent separated, pulled, and/or shredded food product from food items including but not limited to vegetables, fruits, cheeses, cooked meat items as well as a more consistent sized crumble with precooked sausage based items. One embodiment can include a 16 point star shape with angled head or teeth to allow for separating, shredding and/or pulling of a consistent sized product. The blade provides an improved piece sizing in the product while maintaining the natural look desired from the product. Another embodiment includes an additional version with an 8 point shape and modified teeth.

One embodiment of the invention includes an apparatus comprising an angle cut of the star and spacing or greater pitch to allow for a more consistent separation, shred or pull from the product being separated, diced/shredded, or pulled and better control of the finished pieces. The bent star point solution improves the engagement, severing and pulling or shredding action. The device can be used on whole muscle smoked meats to create a hand-pulled-like consistent product and improved results can be seen in the resulting product. Consistent improved pulled sausage (having a hand-pinch like pull) or whole muscle (e.g. pulled pork) that was previously commercially unavailable from equipment manufactures can now be provided.

The engagement and separation action or interaction between the blade and the whole product being separated can vary depending on the speed of the blade, the angle of the points and the width of the blade. Also if adjacent blades are used in a side-to-side relationship then the spacing between adjacent blades and the side-to-side alignment of adjacent star points and their relative speeds can also vary the interaction. The texture, density, firmness, consistency and other aspects of the food product can also vary the interaction. For example, a whole pork meat cut having fibrous muscle tissue will respond to and interact with the blade differently than a cheese product and each of these will respond differently than a vegetable product or any other food product that differs in texture, density, firmness, consistency, pliability or any other characteristic difference. Previous star attachment cutting/shredding blades do not allow for the same separating, severing, shredding and/or pulling action due to the shape of the star points or teeth used. By turning the tips on an angle, a cut and pulling action is achieved, which improves product appearance and consistency. The point makes the initial engagement with the product initiating the separation action rather than the rake area of the tooth. The rake area continues the engagement of the separated portion and the rake area has a varying angle that can increase or decrease the aggressiveness of the engagement and the pulling action.

Another embodiment of the invention is a method for separating away portions of a product comprising the steps of (a) rotating a plurality of blades about a central hub spaced equally apart, (b) providing a platform for supporting the product, where the platform is comprised by the top surfaces of a first set of counter plates positioned between the blades, (c) engaging the product on the platform with the plurality of spaced apart teeth of the blade for separating away portions of the product, and (d) dropping the product through an opening in the platform.

For certain meat cutting or shredding systems, the feed system for feeding the meat into the cutting blades is inadequate in that adequate support of the product is not provided up to the point of engagement of the product with the blades. Therefore, another embodiment of the invention includes a blade block assembly, which relates to a shredder assembly for shredding pieces of a product. The shredder assembly includes a feeding mechanism for feeding pieces of the product to be shredded and a shredder roller assembly. The shredder assembly further includes a shredder, a blade block assembly and a first set of counter plates. A platform is comprised from the topside surfaces or top surface edges of the first set of counter plates. The platform serves to support the pieces of the product which have been fed to the shredder assembly by the feeding mechanism. In addition, in some instances, the platform provides for a pinching action to the pieces of meat/food in conjunction with the blades. The pinching action occurs between the blades and the counter plates as the blades engage the pieces of food product on the platform formed by the topside surface edges of the counter plates. The counter plates are preferably intercalated between the blades.

These and other advantageous features of the present invention will be in part apparent and in part pointed out herein below.

BRIEF DESCRIPTION OF THE SEVERAL VIEWS OF THE DRAWING

For a better understanding of the present invention, reference may be made to the accompanying drawings in which.

Figure 1:
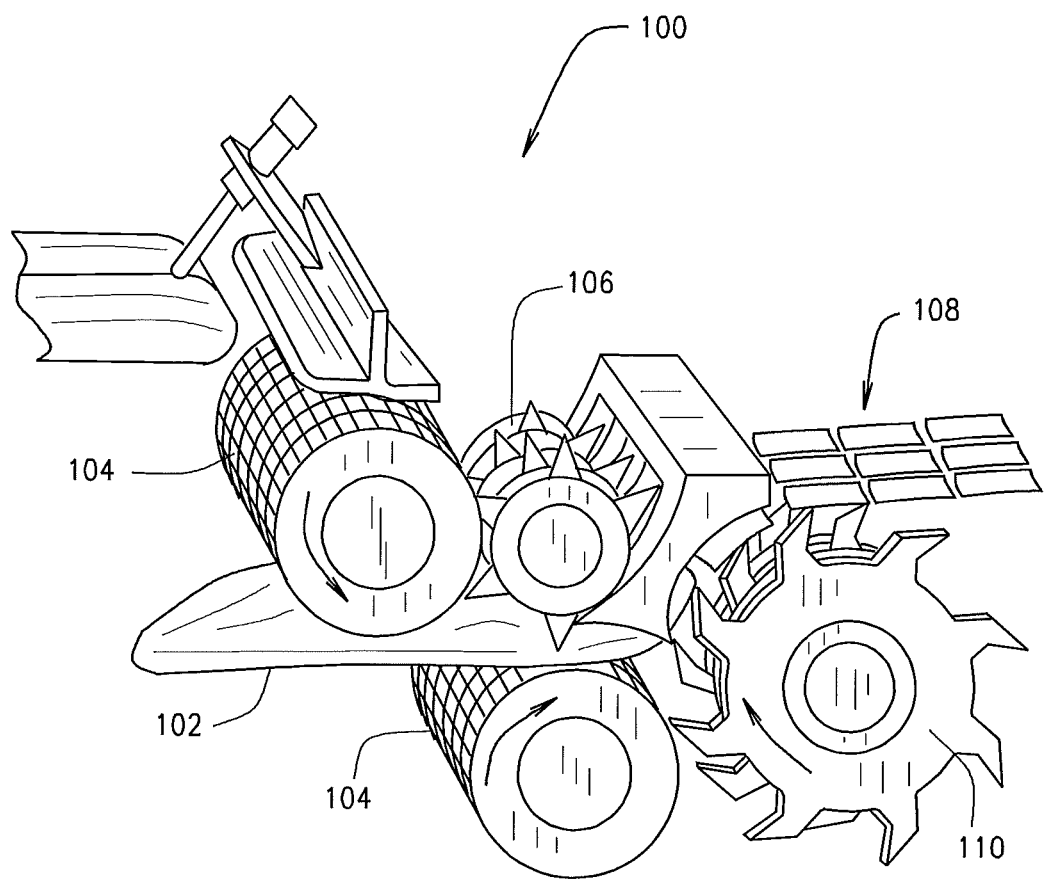
FIG. 1 is an illustration of a shredding configuration.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTIONS OF THE INVENTION

According to the embodiment(s) of the present invention, various views are illustrated in FIGS. 1-8 and like reference numerals are being used consistently throughout to refer to like and corresponding parts of the invention for all of the various views and figures of the drawing. Also, please note that the first digit(s) of the reference number for a given item or part of the invention should correspond to the Fig. number in which the item or part is first identified.

One embodiment of the present invention comprising a circular shredder blade having a forward angled rake and leading point teaches a novel apparatus and method for separating or severing away portions of a food product. For example, one embodiment of the invention can be utilized for shredding a meat product.

The details of the invention and various embodiments can be better understood by referring to the figures of the drawing. Referring to FIG. 1, an illustration of a shredding configuration is shown. The Shredder Assembly 100 illustrated in FIG. 1 is representative of a typical cutter for a food product, particularly a meat shredder or meat dicer configuration. Although, this or a similar configurations can be used for other food products including but not limited to cheeses and vegetables. However the configuration can vary without departing from the scope of the invention. FIG. 1 illustrates a product such as a Meat Product 102 being fed through a set of Feed Rollers 104 and being pulled through the Feed Rollers by a Feed Disc 106 having teeth which engage the product thereby pulling the product through the Feed Rollers and urging the product toward the Shredder Blade 110. The term "shredder blade" used herein is utilized representatively to describe a blade that is not only its scope to be used to shred, but to more generally to separate or sever portions of the food product. Further, the term "shredding" or "shred" or "shreds" is also used herein representatively to include any separating action including severing away and pulling away. The Shredder Blade 110 pulls and separates or shreds meat from the meat product thereby forming a Shredded Meat Product 108 or other food product depending on the application. The rotational direction of the Feed Rollers and the Shredder Blade are indicated by the directional arrows. This configuration can be used to process beef and pork cuts as well as other meat cuts to create a pulled or shredded product. This or a similar configuration can also be used to separate away portions of a vegetable product. The configuration can also be used to process ground meat products such sausage and other ground meat products.

Figure 2:
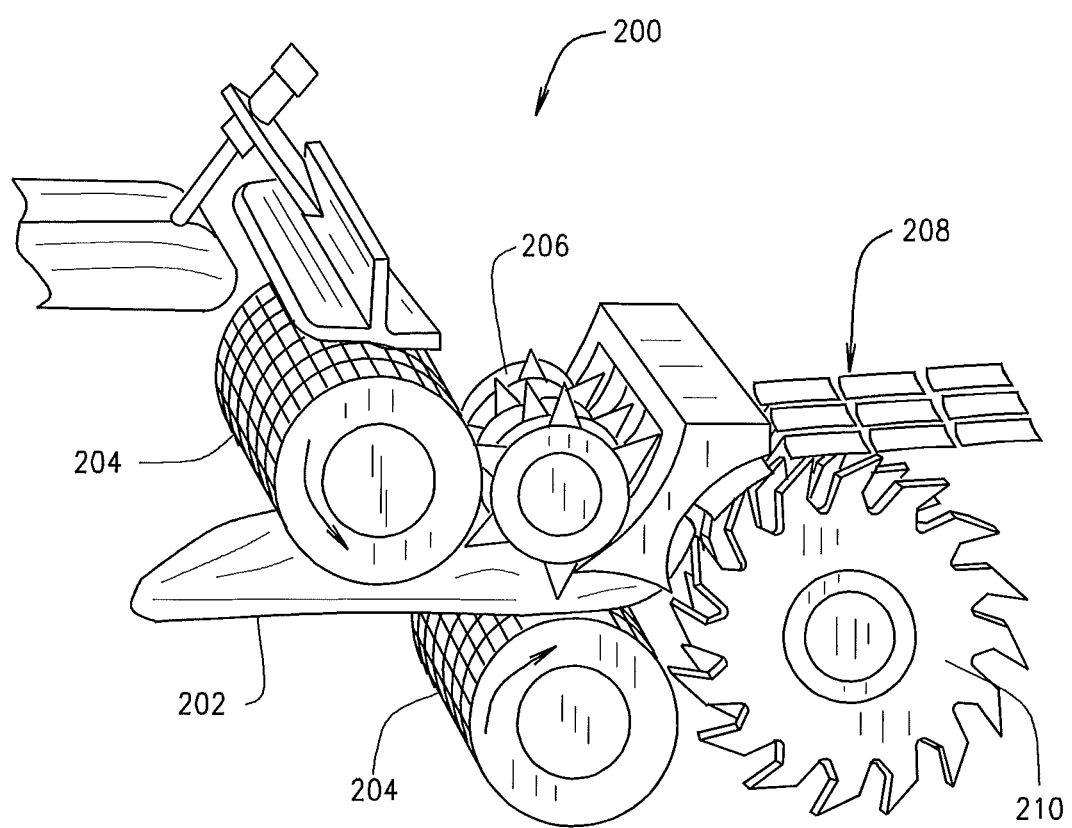
FIG. 2 is another illustration of a shredding configuration.

Referring to FIG. 2 there is another illustration of a shredding configuration. FIG. 2 illustrates another embodiment of a Shredder Assembly 200 including essentially the same components including the Feed Rollers 204 and the Feed Disc 206, which urge the food product toward an engagement with the Shredder Blade 210. The Shredder Blade again engages the meat product or other food product and shreds or separates sections of the meat away from the meat product thereby creating a Shredded Meat Product 208. Again, "shredded meat product", is used to representatively include separated food product. This embodiment illustrates a different blade configuration where the shredder blade has essentially the same diameter, however includes a greater number of teeth thereby reducing the spacing or pitch between the teeth.

Figure 3A:
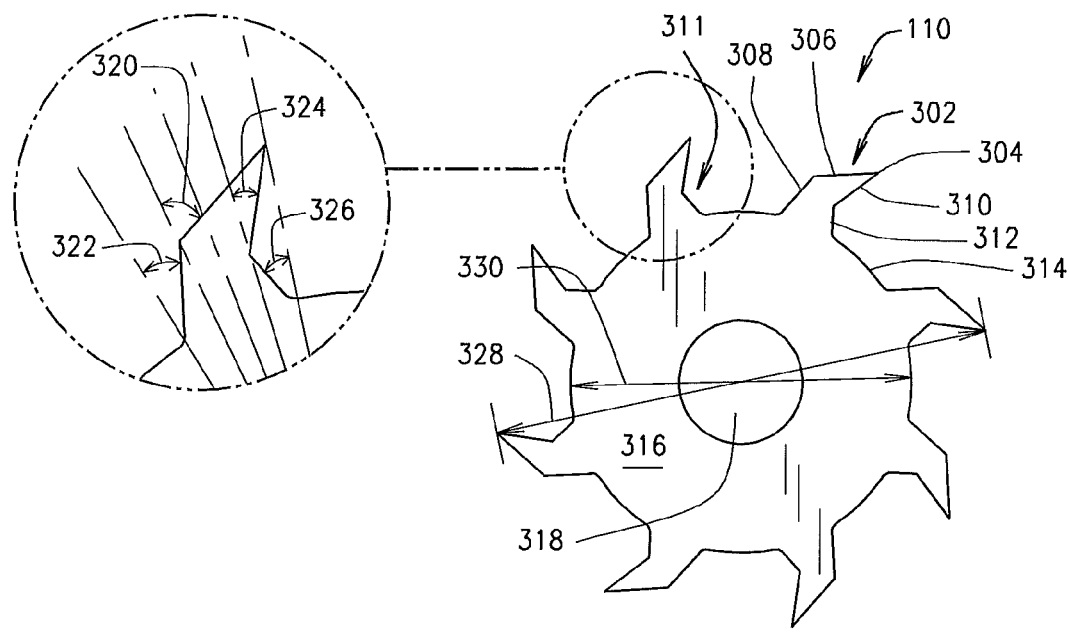
FIG. 3A is an illustration of a shredding blade.

Referring to FIG. 3A, there is an illustration of a shredding blade. FIG. 3A illustrates one embodiment of the Shredder Blade 110. This Shredder Blade embodiment includes a smaller number of teeth as compared to the other embodiment. The blade has a generally circular or disc-like profile in configuration having a certain width or plate thickness. The blade has a plurality of Blade Teeth 302, which are angled forward (positive rake) in order to create a engagement and pulling action when engaging the meat product. One embodiment of the blade could be a roller type blade having a similar profile but with a greater width or thickness. The Blade Teeth can include a Front Face having a Rake 311. The Forward Face of the Tooth 311 having a Rake can be separated into two portions including an Upper Front Face of the Tooth having an Upper Rake 324 of the Tooth 310 and a Lower Front Face of the Tooth having a Rake 326. The Upper Front Face of the Tooth can have a forward angled Rake (positive rake) or angle that extends over Gullet 314. The Lower Front Face of the Tooth can have a Rake or angle that has angled backward (negative rake) with respect to the Gullet thereby creating a multi-angled rake or multi-angled Front Face of the Tooth.

The Gullet 314 between the teeth of the blade can have a facing surface with a convex arc consistent with the circular shape of the overall blade. The positive upper rake 324 with respect to an intersecting radial projection can have a positive angle between 5 to 35 degrees. The negative lower rake 326 with respect to a respective intersecting radial projection can have a negative angle between 5 to 35 degrees. The positive angles 320 and 322 respectively, of the upper 306 and lower 308 trailing faces with respect to their respective intersecting radial projections is between approximately 10° to 70°.

The blade teeth can also have a Trailing Edge 307 that is also multi-angled having an Upper Trailing Edge with a forward angle and a Lower Trailing Edge with a forward angle where the Upper Trialing Edge had a greater forward angle. The multi-angled Front Face of the Tooth having a combination of an Upper Forward Facing angle and a Lower Rearward facing angle creates a forward face that engages the meat product to thereby create a pulling action against the meat product thereby shredded in a manner similar to that of a hand shredding operation. The multi-angled Forward Face provides a greater surface of engagement with the meat product over a blade having a simple Rearward or Forward Facing angled surface. The diameter of the Blade Tip is illustrated by item 328 and the diameter gullet to gullet is illustrated by item 330. The Angles 322, 320, 324 and 326 illustrate the Multi-angled configuration of the Forward Face of the Tooth and the Drilling Edge of the Tooth.

Each of the plurality of spaced apart teeth have a positively facing tip 304 extending positively beyond any point of the respective rake such that the positively facing tip will engage and pull a product prior engagement of the respective rake. The outermost diameter tip to opposing tip is between approximately 6 to 7 inches and the pitch of the plurality of spaced apart teeth is approximately 1 to 3 inches.

It should be noted that without departing from the scope of the invention the blade including the plurality of spaced apart teeth can be positioned immediately adjacent a plurality of substantially identical blades and their respective spaced apart teeth and mounted to rotate about a common axially aligned hub. The blades can rotate synchronously, asynchronously or with a delay or stagger. The adjacent blade teeth of adjacent side-to-side blades can be aligned laterally and rotate in unison or the blade teeth can be staggered or off set such that adjacent blades do not impact the product at the same time.

Figure 3B:
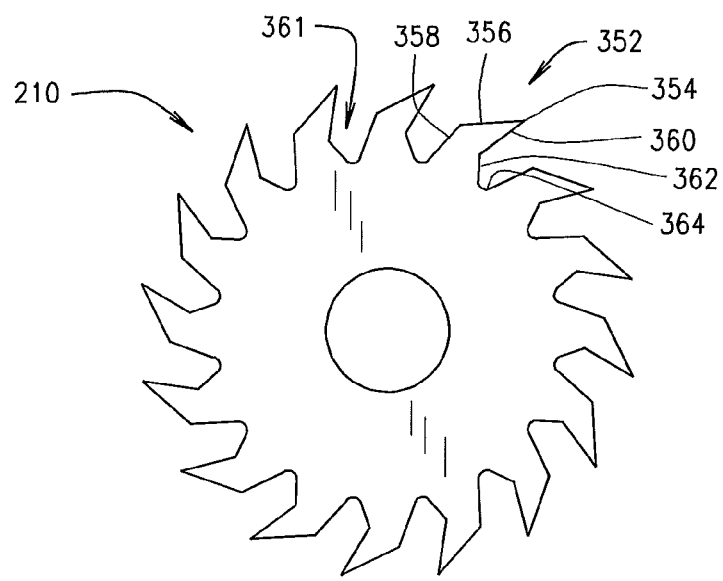
FIG. 3B is another illustration of a shredding blade.
Figure 4:
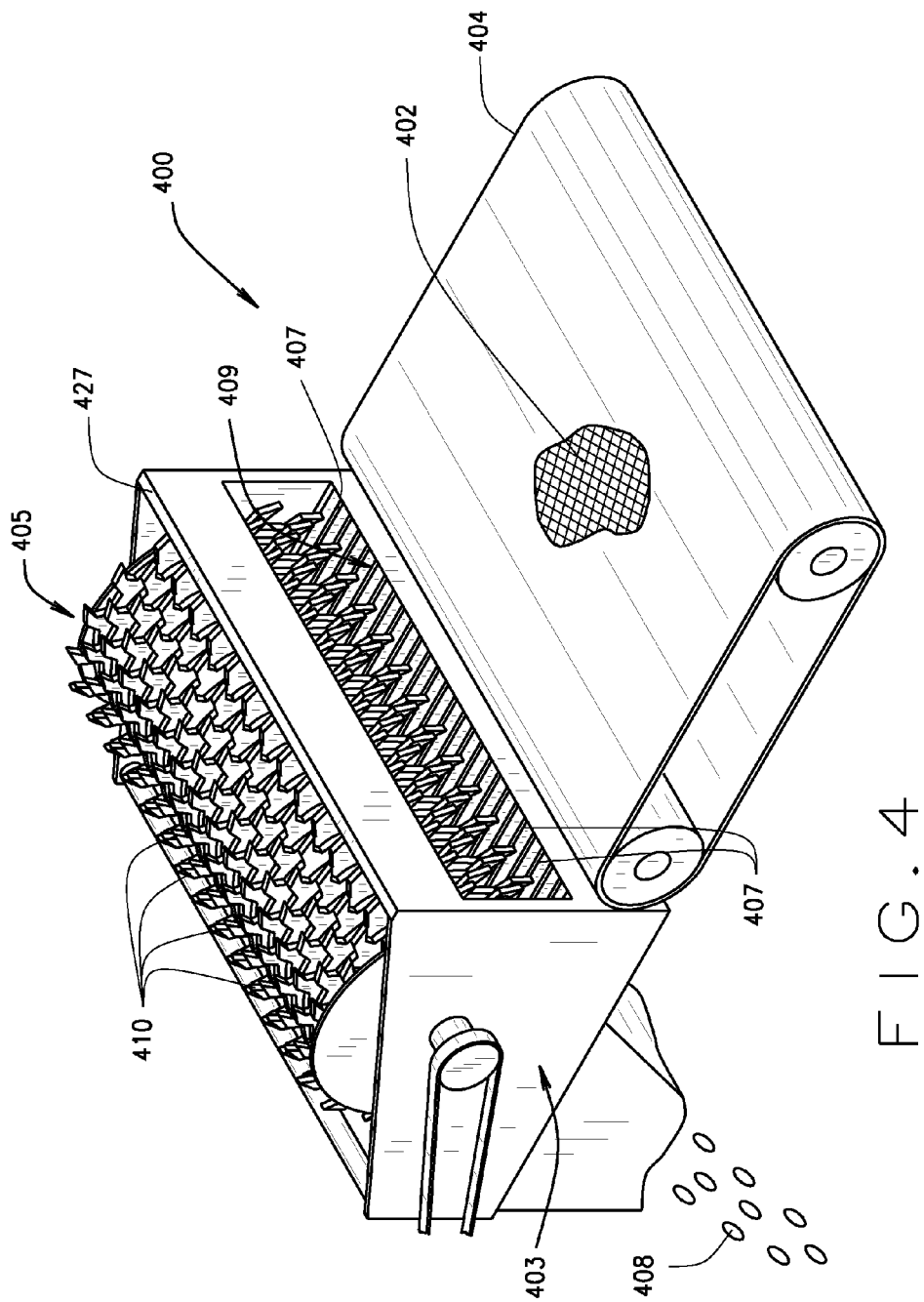
FIG. 4 illustrates a perspective view of a shredding apparatus.

Referring to FIG. 3B, there is another illustration of a shredding blade. FIG. 3B illustrates the Shredder Blade 210 having a greater number of Blade Teeth 352 however where the Front Face of the Tooth 361 and the Upper Front Face of the Tooth 360 and the Lower Front Face of the Tooth 362 are similar to that shown in FIG. 3A. Further, the Trailing Edge 357 and the Upper and Lower Trailing Edges 356 and 358 respectively are also similar to that shown in FIG. 3A. However, given the greater number of teeth the Gullet Area 364 is smaller or shorter and having a concave surface such that the distance between the teeth or the pitch is smaller. This shorter Gullet or shorter pitch will result in a different sized meat product thereby creating a finer shredded product than the blade shown in FIG. 3A.

One embodiment for the blade for shredding includes a blade having a generally circular profile with a generally circular periphery and a width. The blade can have a plurality of spaced apart teeth attached to the blade about the periphery where a pitch of the teeth defines a gulley between teeth and said plurality of teeth extending outward from the periphery and each of the plurality of spaced apart teeth having a front face of, where the front face has a multi angled rake including a positive upper rake and a lower negative rake. The distance gulley to gulley can be less than the length of the gulley or the distance gulley to gulley can be greater than the length of the gulley to thereby generate a finer shred.

FIG. 3A reflects a blade having the plurality of spaced apart teeth including eight equally spaced teeth. FIG. 3B illustrates the plurality of spaced apart teeth including sixteen equally spaced teeth. As shown in FIG. 3A, the gulley can have an outward facing surface that has a generally convex arcuate contour consistent with the generally circular profile of the blade. As shown in FIG. 3B the gulley can have an outward facing surface having a generally concave arcuate contour. Each of the plurality of spaced apart teeth can have a positively facing tip extending positively beyond any point of the respective rake such that the positively facing tip engages and pulls a product prior engagement of the respective rake. This configuration can be used to process various products including but not limited to beef and pork cuts as well as other meat cuts to create a pulled or shredded product. This configuration or similar configuration can also be used for other food products including but not limited to ground meat products, vegetables and other products. For example, this configuration can also be used to process ground meat products such as sausage and other ground meat products. For another example, a pulled pork product can be produced. Also, Italian sausage pizza crumbles can be manufactured from a ground sausage product.

With a pre-cooked ground sausage product, the sausage can be feed into a blade where the positive angle with respect to an intersecting radial projection of the positive upper rake is between approximately positive 5° to 35°; where the negative angle with respect to an intersecting radial projection of the negative lower rake is between approximately negative 5° to 35°; where the positive angle of the upper and lower trailing faces with respect to their respective intersecting radial projections is between approximately 10° to 70°; where each of the plurality of spaced apart teeth have a positively facing tip extending positively beyond any point of the respective rake such that the positively facing tip engages and pulls a product prior engagement of the respective rake; where the outermost diameter tip to opposing tip is between approximately 6 to 7 inches and the pitch of the plurality of spaced apart teeth is approximately 1 to 3 inches; and where the blade including the plurality of spaced apart teeth is positioned immediately adjacent a plurality of substantially identical blades and their respective spaced apart teeth and mounted to rotate about a common axially aligned hub.

Further, the blade including the plurality of spaced apart teeth can be positioned immediately adjacent a plurality of substantially identical blades and their respective spaced apart teeth and mounted to rotate about a common axially aligned hub as illustrated in FIG. 1.

The various shredder blade and shredder assembly examples shown above illustrate a method and apparatus for shredding a meat product. A user of the present invention may choose any of the above embodiments, or an equivalent thereof, depending upon the desired application. In this regard, it is recognized that various forms of the subject shredder blade and assembly could be utilized without departing from the spirit and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the present invention.

In another embodiment, the shredding assembly funnels the pieces of the product into a compressed space. A further embodiment is that the method for separating away portions of a product include the plurality of spaced apart teeth comprises eight equally spaced teeth. Alternatively, the plurality of spaced apart teeth comprises sixteen equally spaced teeth. In another embodiment, the gulley has an outward facing surface and has a generally convex arcuate contour consistent with the generally circular profile of the blade. Alternatively, the gulley has an outward facing surface and has a generally concave arcuate contour. In another embodiment, the method for separating portions of a product comprises engaging the product with the plurality of spaced apart teeth comprises pinching the product as the product is rotated by the blades. In another embodiment, a set of the plurality of counter plates intercalates between the plurality of blades as the blades rotate to compress the product.

Other embodiments, such as those shown in FIGS. 4-8, may relate to a shredder assembly 400. For example, referring to FIG. 1, the shredder assembly 400 is preferably used for shredding a food product 402 such as, for example, meat, cheese, vegetables, etc. FIG. 1 illustrates a product 402 such as a meat product being fed by a feed roller 404, toward the shredder blade 410. It is noted that one feed roller 404 is shown, although multiple feed rollers 404, such as top and bottom feed rollers 404, may be utilized. The term "shredder blade" 410 used herein is utilized to describe a blade that is designed to shred rather than cleanly slice the food product. However, it is recognized that slicing or other blades could also be used. Further, the term "shredding" or "shred" or "shreds" is also used herein representatively to include any separating action including severing away and pulling away.

As the feed roller 404 feeds product 402 to the shredder blades 410, the shredder blades 410 shred the food product 402, thereby forming a shredded food product 408. This configuration can be used to process beef and pork cuts as well as other meat cuts to create a pulled or shredded product. This or a similar configuration can also be used to separate away portions of a vegetable product. The configuration can also be used to process ground meat products such sausage and other ground meat products.

One embodiment is a shredder assembly 400 for shredding pieces of a product 402, and includes a feeding mechanism such as a feed roller 404. A conveyor is a non-limiting example of a feed roller 404. Feed roller 404 feeds pieces of the product 402 to be shredded to a blade block assembly 403. The blade block assembly 403 supports a shredder 405 which includes a plurality of flat, interspersed, rotational, shredding blades 410. The blade block assembly 403 includes a first set of a plurality of vertical counter plates or interspersed fins 407 intercalated between the interspersed, rotational, shredding blades 410. The counter plates 407 preferably extend substantially parallel with the shredding blades 410. At least some, and preferably each of the counter plates 407 have a top surface edge, and the top surface edges of each of the counter plates 407 form a platform 409. The platform 409 serves to support the pieces of the product during shredding, and provide a pinching action, in combination with the shredding blades 410, when the interspersed, rotational, shredding blades 410 engage the pieces of the product 402 on the platform 409. Preferably, the platform 409 extends along the return run of the blades 410, and is vertically disposed at the cutting depth of the blades 410.

Further, shredder assembly 410 may include an opening 420 which allows pieces of the product to pass through having been shredded by the shredder assembly 400. The platform 409 supports the pieces of the product 402 so as to allow them to enter into an effective shredding zone and at the appropriate cutting depth in which the blades 410 can effectively engage the pieces of the product 402. Once pieces of the product 402 are supported on the platform, the blades 410 hook or shred the pieces of the product 402 as the teeth of the blades 410 grabs, pinches and separates the product as the blade tooth passes between the vertical counter plates (also referred to as fins or fingers). The counter plates can act collectively with the action of the blade to pinch or squeeze the pieces of the product allowing for their shredding.

In a further embodiment, the platform comprises a second set of a plurality of flat counter plates 427 that can intercalate between the rotational blades. The collective sets of counter plates 407, 427 act as a counter force, or resistance, against the blades 410 simply pulling pieces of the product 402 around, in order to achieve the desired shredding. This counter force can therefore aid in the shredding of the pieces of the product 402, and help prevent pieces of the product 402 from becoming lodged between the blades 410, thereby clearing cut product from between the blades.

Figure 5:
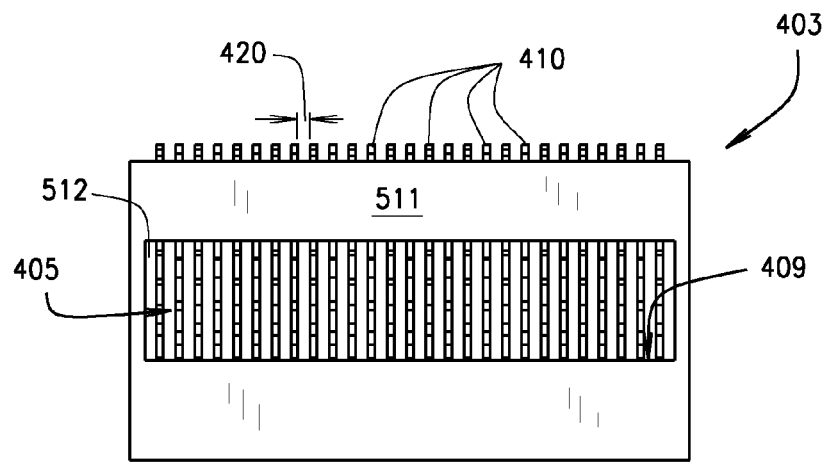
FIG. 5 illustrates a perspective view of another shredding apparatus.

FIG. 5 illustrates a frontal elevation view of a blade block assembly 403 and shredder 405 for shredding pieces of a product. The plurality of shredding blades 410 are visible through the front of the shredder 405. The top surface of each of the counter plates 407 forms platform 409, the depth of which is not visible in FIG. 5. Further, a cutting side face plate 511 of the blade block assembly 403 is shown to include an opening 512 for allowing a food product pass through for shredding.

Figure 6:
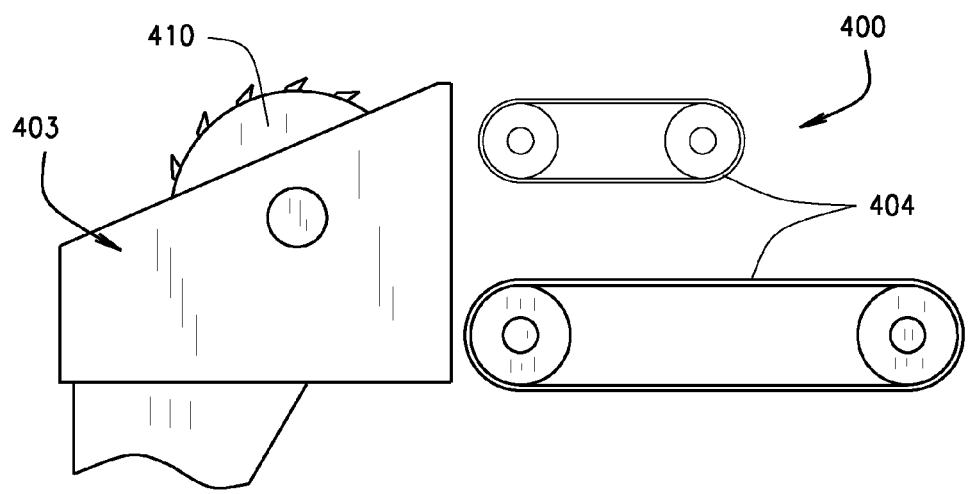
FIG. 6 illustrates a frontal view of a shredding apparatus.

FIG. 6 illustrates a side elevation view of a shredder assembly 400 for shredding pieces of a product 402. As can be seen feed roller 404 may feed the pieces of the product 402 to the shredder 405 housed by the blade block assembly 403. As shown, a second shredder roller 404 may also be present. Further, a side face plate of the blade block assembly 403 is shown, which extends perpendicularly to the cutting side face plate shown in FIG. 5. As will be understood, another side face plate is positioned on the opposing side of the blade block assembly 403.

Figure 7:
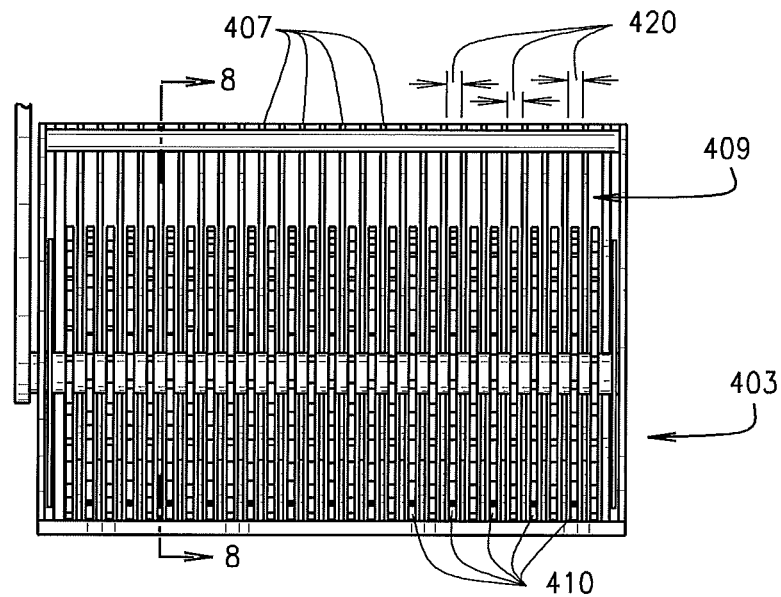
FIG. 7 illustrates a side view of a shredding apparatus.

FIG. 7 illustrates a bottom view of a blade block assembly 403 housing a shredder 405 with blades 410, in which platform 409 is more readily apparent. Openings 420 are also visible in the spaces between the counter plates 407, which allow shredded food products 408 to pass through, having been shredded by the shredder 405. The blades 410 are also visible interspersed between the counter plates 409.

Figure 8:
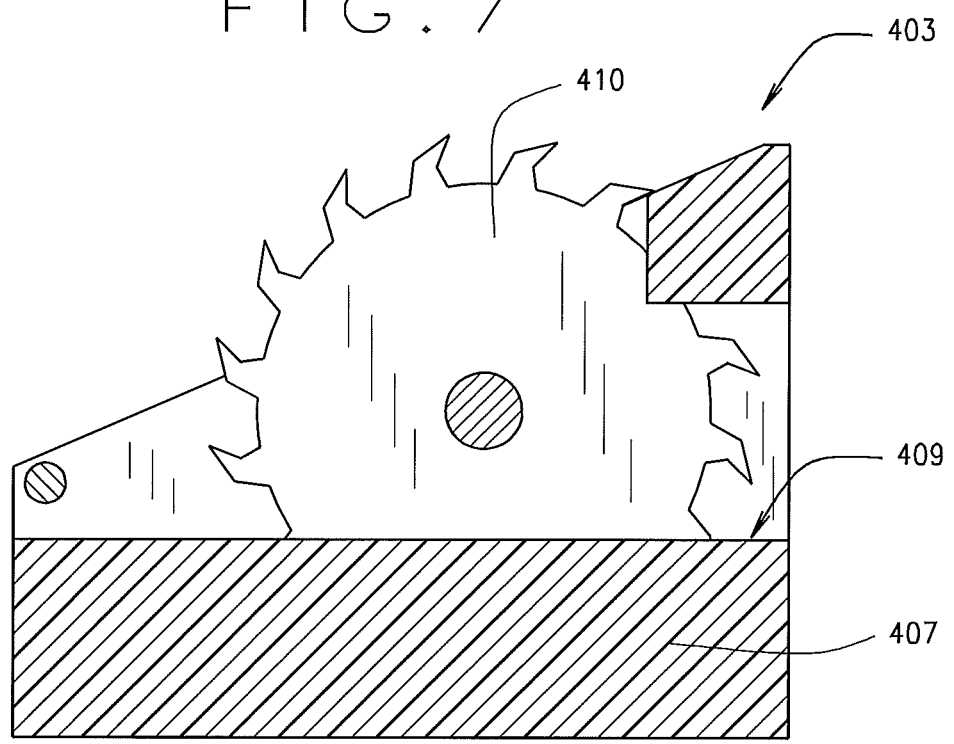
FIG. 8 illustrates a bottom of a shredding apparatus.

FIG. 8 illustrates a cross-sectional view of a blade block assembly 403 taken along line 5-5 shown in FIG. 7. A blade 410 is seen in the cross section of FIG. 8, as well as a counter plate 407. The top surface of the counter plate 407 acts to form part of platform 409 with the top surfaces of the other counter plates 407.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the present invention.

Other aspects, objects and advantages of the present invention can be obtained from a study of the drawings, the disclosure and the appended claims.

What is claimed is:

1. An apparatus for shredding pieces of a product comprising:
   a feeding mechanism for feeding pieces of the product to be shredded; and
   a shredder assembly comprising,
      a shredder with a plurality of interspersed, rotational, circular shredding blades;
      a blade block assembly supporting the shredder and partially encasing the shredding blades with a cutting side face plate and opposing side plates extending perpendicularly thereto, the blade block assembly including a first set of a plurality of vertical counter plates extending substantially in parallel with and intercalated between the interspersed, rotational, shredding blades,
      wherein each counter plate has a top surface edge, and the top surface edges of the counter plates form a platform extending along the return run of the circular blades and vertically disposed at the cutting depth of the blades, and
      wherein the platform serves to support the pieces of the product during shredding and to provide a pinching surface to the pieces of the product when the interspersed, rotational, shredding blades engage the pieces of the product on the platform; and an opening in the cutting side face plate, wherein pieces of the product can pass through to be shredded by the shredder.

2. The apparatus for shredding pieces of a product of claim 1, wherein the blade block assembly comprises a second set of a plurality of counter plates that are intercalated between the interspersed, rotational, shredding blades, wherein the collective sets of counter plates act as a counter force against the direction of the shredder whereby the counter force aid in the shredding of the pieces of the product by causing the pinching action between the interspersed, rotational, shredding blades and the counter plates extend between the interspersed shredding blades, thereby removing pieces of the product from between the interspersed rotational blades.

3. The apparatus for shredding pieces of a product of claim 1, wherein the feeding mechanism is positioned proximate the platform of the shredder assembly.

4. The apparatus for shredding pieces of a product of claim 1, wherein the blade has a generally circular profile with a generally circular periphery and a width; a plurality of spaced apart teeth attached to the blade about the periphery where a pitch of the teeth defines a gulley between teeth and the plurality of teeth extending outward from the periphery and each of the plurality of spaced apart teeth having a front face, where the front face has a multi angled rake including a positive upper rake and a lower negative rake.

5. The apparatus of shredding pieces of a product of claim 4, wherein the gulley has an outward facing surface that has a generally convex arcuate contour consistent with the generally circular profile of the blade.

6. The apparatus of shredding pieces of a product of claim 4, wherein the gulley has an outward facing surface has a generally concave arcuate contour.

7. The apparatus for shredding pieces of a product of claim 1, wherein each blade comprises an outwardly facing, jagged, metal tooth.

8. The apparatus for shredding pieces of a product of claim 7, wherein each tooth is spaced periodically along the circumference of each blade.

9. The apparatus of shredding pieces of a product of claim 8, wherein the plurality of spaced apart teeth comprises eight equally spaced teeth.

10. The apparatus of shredding pieces of a product of claim 8, wherein the plurality of spaced apart teeth comprises sixteen equally spaced teeth.

11. The apparatus for shredding pieces of a product of claim 1, wherein the opening is adjacent to a set of plurality of counter plates.

12. A method for separating away portions of a product comprising the steps of:

rotating a plurality of blades about a central hub spaced equally apart, wherein each blade having a generally circular profile with a generally circular periphery and a width, and further having a plurality of spaced apart teeth attached to the blade about the periphery where a pitch of the teeth defines a gulley between teeth and said plurality of teeth extending outward from the periphery and each of the plurality of spaced apart teeth having a front face;

providing a platform for supporting the product, said platform being comprised by top surfaces of a first set of counter plates positioned between adjacent blades of said plurality of blades;

engaging the product on the platform with the plurality of spaced apart teeth of the blades and pinching the product with the teeth of the blades and the platform for separating away portions of the product;

dropping the product through an opening in the platform.

13. The method as recited in claim 12, where the platform is a blade block assembly supporting the shredder and partially encasing the shredding blades with a cutting side face plate and opposing side plates extending perpendicularly thereto, the blade block assembly including a first set of a plurality of vertical counter plates extending substantially in parallel with and intercalated between the interspersed, rotational, shredding blades, wherein each counter plate has a top surface edge, and the top surface edges of the counter plates form a platform extending along the return run of the circular blades and vertically disposed at the cutting depth of the blades.

14. The method as recited in claim 12, where the front face has a multi angled rake including a positive upper rake and a lower negative rake.

15. The method for separating away portions of a product of claim 12, wherein the plurality of spaced apart teeth comprises eight equally spaced teeth.

16. The method for separating away portions of a product of claim 12, wherein the plurality of spaced apart teeth comprises sixteen equally spaced teeth.

17. The method for separating portions of a product of claim 12, wherein the gulley has an outward facing surface and has a generally convex arcuate contour consistent with the generally circular profile of the blade.

18. The method for separating portions of a product of claim 12, wherein the gulley has an outward facing surface and has a generally concave arcuate contour.

19. The method for separating portions of a product of claim 12, wherein engaging the product with the plurality of spaced apart teeth comprises urging the product to engage the spaced apart teeth with upper and lower inwardly and oppositely rotating pinch rollers.

20. The method for separating portions of a product of claim 12, wherein engaging the product with the plurality of spaced apart teeth comprises pinching the product as the product is rotated by the blades.

21. The method for separating portions of a product of claim 12, wherein a set of the plurality of counter plates intercalates between the plurality of blades as the blades rotate to compress the product.

\* \* \* \* \*